United States Patent [19]

Harris, Jr.

[11] Patent Number: 4,616,381
[45] Date of Patent: Oct. 14, 1986

[54] OVA HARVESTING SYSTEM

[75] Inventor: Clarence E. Harris, Jr., Beltsville, Md.

[73] Assignee: The United States of America as represented by the Secretary of the Agriculture, Washington, D.C.

[21] Appl. No.: 724,013

[22] Filed: Apr. 17, 1985

Related U.S. Application Data

[63] Continuation-in-part of Ser. No. 496,518, May 20, 1983, abandoned.

[51] Int. Cl.[4] .............................................. A22C 21/06
[52] U.S. Cl. ............................................ 17/45; 17/11
[58] Field of Search ....................... 17/45, 11, 24, 1 R; 198/802, 478

[56] References Cited

U.S. PATENT DOCUMENTS

| | | | |
|---|---|---|---|
| 1,316,626 | 9/1919 | Lundell | 17/24 |
| 1,992,686 | 2/1935 | Anderson | 209/942 X |
| 2,516,499 | 7/1950 | Albright | 17/11 X |
| 2,738,547 | 3/1959 | Zebarth | 17/11 |
| 4,090,275 | 5/1978 | Jorgensen et al. | 17/24 |
| 4,372,099 | 2/1983 | Linville | 17/11 X |

Primary Examiner—Willie G. Abercrombie
Attorney, Agent, or Firm—M. Howard Silverstein; David G. McConnell

[57] ABSTRACT

An ova harvesting system is provided as an adjunct to a poultry evisceration line to collect ova from slaughtered fowl. Ova are removed from the poultry carcass and placed in cups located immediately below the carcass to minimize loss. A cup conveyor carries the cups away from the evisceration line before reaching the viscera pulling station to avoid contamination of the ova. The cups are then transported to a receiving tank into which the ova are automatically discharged. The system provides a mechanism for disposal of ova from condemned carcasses in response to the inspector's condemnation.

7 Claims, 4 Drawing Figures

OVA HARVESTING SYSTEM

This is a continuation-in-part of patent application Ser. No. 496,518, filed May 20, 1983, now abandoned.

FIELD OF THE INVENTION

The present invention relates to an ova harvesting and handling system for the ova of slaughtered hens, as an adjunct to poultry evisceration lines.

BACKGROUND OF THE INVENTION

In present day poultry processing plants fowl are slaughtered and defeathered in one room of the plant and are eviscerated in another. Evisceration lines basically consist of a transport mechanism such as an overhead shackle conveyor from which the defeathered carcasses are suspended. The carcasses are thus transported to work stations where various operations are performed in sequence. Normally, the first operation is the opening cut and/or vent removal whereby the interior of the body is rendered accessible. The opened carcass is then transported to the viscera pulling station where the viscera are pulled out of the body cavity. Usually, the viscera are not actually removed but are left dangling from the carcass. Downstream of the viscera pulling station is an inspection station where the carcass and viscera are inspected for wholesomeness. If ova have been collected and a fowl is condemned, the ova from that fowl must be discarded with the fowl. Ova are not attached to the viscera, they are part of the separate reproductive system, and if they rupture inside they do not contaminate the carcass. Viscera comprise intestines, stomach, liver, heart, lungs, and other organs. If viscera rupture inside the carcass everything must be condemned, and if ova come in contact with ruptured viscera, they too must be condemned. It is preferable, therefore, to remove the ova before the viscera are pulled and to make certain that the ova will not be in the vicinity of the carcass when the viscera are pulled.

Presently, two systems are used in the poultry industry for harvesting ova, one prior to inspection and one subsequent to inspection. The latter is quite messy and results in substantial loss of product, and for these reasons, is used in only a few plants. However, the present "before inspection" method, while preferred over the post inspection method, also suffers a number of disadvantages. Basically, the present before inspection method uses a small ova cup which is attached to the evisceration shackle, the cup being attached by a single metal ring well above the operator. With this arrangement, the cup tends to swing back and forth, making it very difficult for an operator to lift and place into the cup a handful of the slippery ova. Twenty or more percent of the ova can be lost during this process. Further, these cups must travel the entire distance that the evisceration line travels, and since this approach does not provide a good system for cleaning the cups, additional problems are created by the fact that the travel time period of the cups is such that the yolk from a ruptured ovum tends to dry on the cup, thereby producing a difficult cleaning problem.

SUMMARY OF THE INVENTION

In accordance with the present invention, an ova harvesting system is provided which overcomes the problems with prior art systems discussed above and which enables harvesting and handling of ova from slaughtered hens prior to evisceration in an efficient and sanitary manner. The system complies with all known existing regulations, particularly with respect to the condemnation or rejection of ova when the bird from which the ova is taken has been condemned.

The ova harvesting system of the invention is used as an adjunct to a poultry evisceration line of the type which includes a carcass conveyor for moving slaughter fowl to various work stations in sequence such as an opening cut station, a viscera pulling station, and an inspection station. The ova harvesting system comprises the following:

An ova collecting station located on the evisceration line between the opening cut station and the viscera pulling station. This is where the ova is removed from the poultry carcass;

A cup conveyor positioned in a manner such that it converges with the evisceration line upstream from the ova collecting station, and diverges from the evisceration line upstream from the viscera pulling station. It is critical that the ova be removed from the vicinity of the carcass before the viscera are pulled. Otherwise the ova would become contaminated by drippings from the viscera. Ova thus contaminated would be unacceptable for food;

A plurality of cups or other such containers are mounted sequentially along the cup conveyor for containing the ova collected at the ova collection station;

A reject tank positioned beneath the cup conveyor down stream of the evisceration line;

An ova receiving tank positioned beneath the cup conveyor downstream of the reject tank;

A first discharge means engaging the cups at the reject tank for discharging ova contained in the cups into the reject tank;

An actuating means connected to the first discharge means for actuating the first discharge means. The actuating means is located at the inspection station so that, if a fowl is rejected, the ova from that fowl can be disposed of remotely from the inspection station even though the ova is at another location.

A second discharge means engaging the cups at the receiving tank for discharging the ova contained in the cups into the receiving tank.

A cup conveyor driving means for driving the cup conveyor in a manner such that when a carcass is at the ova collection station one of the cups is located in close proximity below the carcass, and when the carcass is at the inspection station the cup is positioned over the reject tank. By having the cup directly below the carcass ova will be collected with minimal loss.

In a preferred embodiment each cup is movable from an upright, ova receiving position to a tipped position wherein the contents thereof are discharged; the first discharge means is a first cup tipper means for, when actuated by remote control from the inspection station, tipping one of the cups so as to discharge the contents thereof into the reject tank; the second discharge means is a second cup tipper means for tipping all of the cups in sequence while said cups are over the ova receiving tank so as to discharge the contents of the cups into the ova receiving tank; and the system further includes a third cup tipper means for returning all of the cups to the ova receiving position thereof prior to the cups being conveyed back to the ova collection station.

Preferably, the system includes means for providing driving of the cup conveyor from the evisceration line. Advantageously, the shackle conveyor comprises an overhead conveyor and the driving means comprises a first gear wheel driven by the overhead conveyor, an intermediate drive shaft connnected, e.g., by a U-joint, to the first gear wheel, and a further gear wheel, connected, e.g., by a further U-joint, to the drive shaft, for driving the cup conveyor.

In a preferred embodiment, a cup washing station is located downstream of the ova receiving tank, the cup washing station comprising washing means for washing the cups prior to being returned to an upright position. Washing is facilitated with nozzles within a cabinet equipped with a drain.

Advantageously, the first cup tipper means comprises a remote controlled air operated cup tipper. Advantageously, first and second flumes are connected respectively to the reject tank and the ova receiving tank, each equipped with water outlets to provide a continuous flow of water to move the ova to collection points.

Other features and advantages of the present invention will be set forth in, or apparent from a detailed description of the present invention found herein.

DESCRIPTION OF THE PREFERRED EMBODIMENTS

The ova harvesting system described herein is useful as an adjunct to poultry evisceration lines. That is, it is added to an evisceration line but is not an essential part of that line. It is understood that the system can be added easily to existing evisceration lines or it can be incorporated into new plant designs. The cup conveyor can be driven by independent means, but preferably it is driven by the evisceration line itself. In this way the movements of the cup conveyor and the evisceration line are more easily synchronized. Synchronization in this instance does not mean that cups and carcasses move together. It means only that the two lines must travel in a manner such that where a carcass is at the inspection station the cup containing the ova from that carcass is over the rejection tank. It is not even necessary for the lines to move at the same speed.

Figure 1:
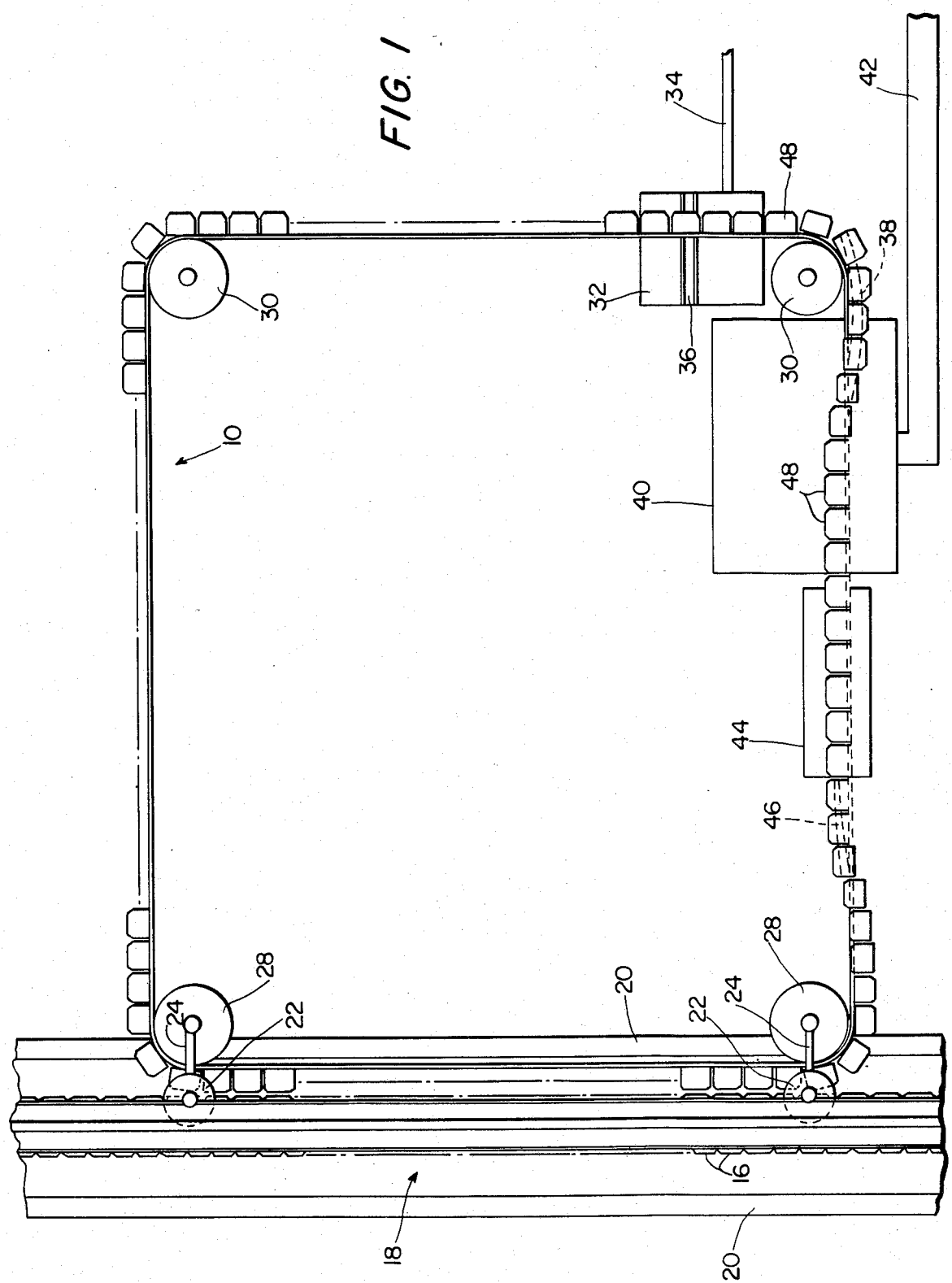
FIG. 1 is a plan view of a preferred embodiment of the ova harvesting system of the invention.
Figure 2:
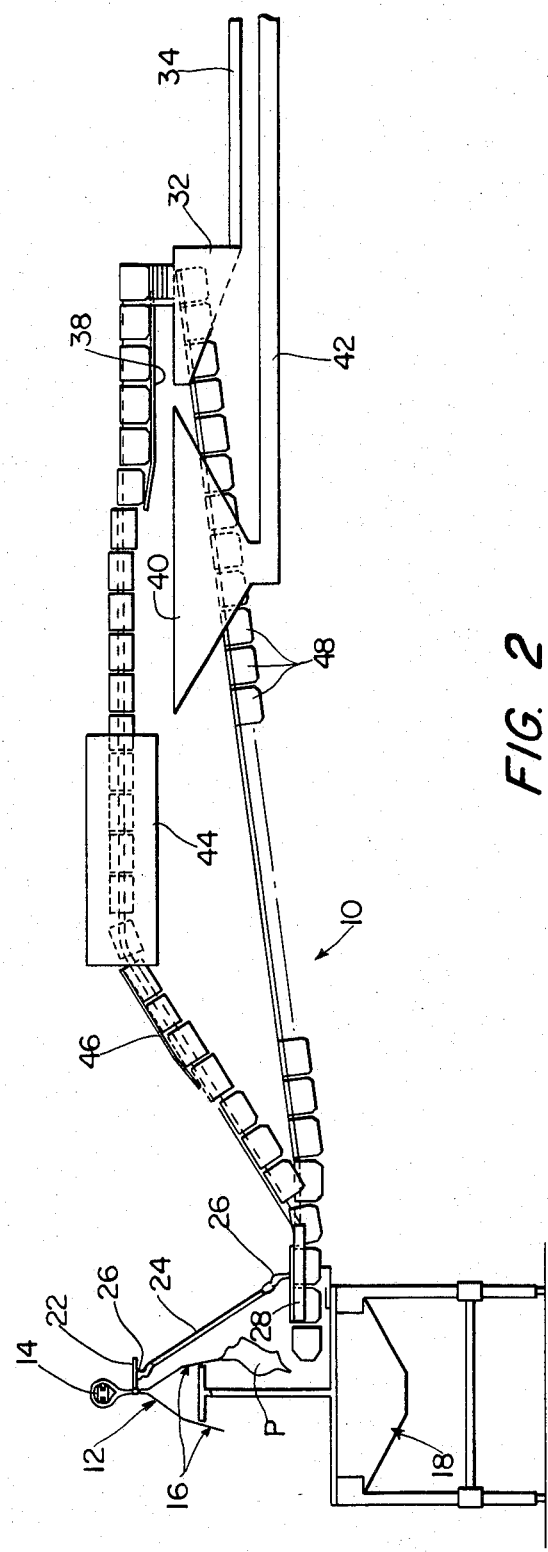
FIG. 2 is a side elevational view of the system of FIG. 1.

Referring to FIGS. 1 and 2, a schematic representation of one embodiment of the ova harvesting system of the invention is provided. The system basically comprises a cup conveyor arrangement, generally denoted 10, disposed adjacent an overhead shackle conveyor 12 (see FIG. 2) of an evisceration line. The shackle conveyor 12 includes overhead I-beam 14 and shackles 16 from which are suspended the poultry P (FIG. 2). The shackle conveyor 12 is located above an evisceration trough 18. Water flumes 20 are provided on both sides of evisceration trough 18 as can be best seen in FIG. 1. It will be understood that the shackle conveyor and evisceration trough system just described is conventional in nature and can take other forms, and thus further description thereof will be dispensed with.

As shown in FIG. 1, a pair of gear wheels 22, in engagement with shackle conveyor 12, are connected through corresponding drive shafts 24 and associated U-joints 26 (seen best in FIG. 2) to respective large gear wheels 28 at two corners of conveyor 10. Further gear wheels 30 are provided at the other corners of cup conveyor arrangement 10. Conveyor 10 is generally rectangular in form with one side extending parallel to shackle conveyor 12 and evisceration trough 18. The cup conveyor 10 is driven from the evisceration conveyor 12 through the gearing arrangement described above so that as conveyor 12 moves, this movement causes rotation of gear wheels 22, and ultimately, through the agency of drive shafts 24 and associated U-joints 26, causes rotation of gear wheels 28. Rotation of the latter causes conveyor 10 to move in synchronism with evisceration shackle conveyor 12. In one embodiment of the invention both shackle conveyor 10 and cup conveyor 12 comprise chain drive systems and gear wheels 22 and 28 are sprockets. Other drive means known to those skilled in the art are considered to be within the scope of the invention.

A series of stations are located along the other sides of conveyor 10. These include, in sequence, a reject tank 32 connected to a flume 34, and an associated air operated cup tipper 36; a further cup tipper 38; an ova tank 40 connected to a flume 42; a cup washer 44; and an additional cup tipper 46. Ova collecting station is generally denoted at 1.

Cup conveyor arrangement 10 carries a plurality of cups 48 attached thereto. Cups 48 are spaced apart the same distance as the spacing between the evisceration shackles 16 and are positioned such that they are directly below poultry P suspended from shackles 16. This distance is 6 inches on center in the specific embodiment under consideration although shackles spaced on 8 or 12 inch on center are also typical. The number of cups 48 provided in the ova harvesting system of the invention is a function of the speed of the evisceration line and the illustrated embodiment is designed for use with a 7,000 bird per hour line.

Figure 3:
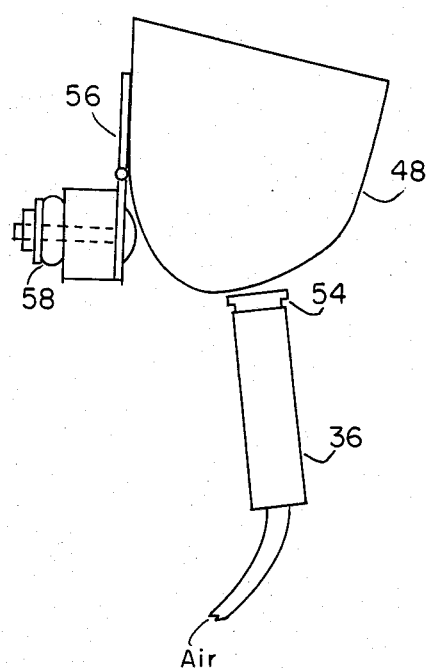
FIG. 3 is a side view of an ova cup showing its connection to the cup conveyor, and one embodiment of a cup tipper.

The cups 48 themselves are molded and in a specific example, are 5 by 4 by 4¾ inches in size. The cups 48, FIG. 3, each have attached thereto hinge 56 which is also secured to a chain link 58 of conveyor 10. This enables the cups to be readily tipped from an upright position in response to a tipping force. Preferably, each cup moves in synchronization with a shackle on the evisceration line in a manner such that, when the shackle containing the eviscerated hen is at the inspection station, the associated cup containing the ova from the same hen is above reject tank 32. First cup tipper 36, FIG. 3, is operated by air pressure to drive plunger 54 in response to actuation by the inspector or by the action of removing the hen from the shackle, thereby pushing the cup into a tipped position and dumping the ova from the rejected hen into reject tank 32. The bottom wall of tank 32 is water flushed and sloped as shown in FIG. 2 so that rejected ova is guided to flume 34.

Figure 4:
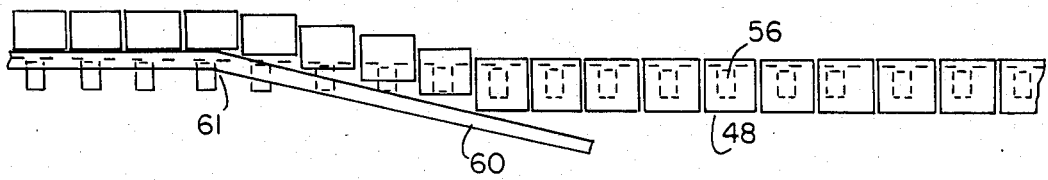
FIG. 4 is a side view of one portion of the cup conveyor and a cup tipper.

Second cup tipper 38, FIG. 4, is comprised of stationary bar 60 positioned in the path of cups 48 over ova tank 40. Bar 60 is sloped in a manner such that, as the bottom of cups 48 contact the bar, the bar's slope raises cups 48, pivots them about hinge 56 and flips them over at the bar 60's highest point of slope 61, thereby dumping the ova into tank 40. Ova tank 40 is generally funnel shaped with water flushed sloped side walls and drains into flume 42 as shown in FIG. 2.

After leaving ova tank 40 and while still in the tipped positions, cups 48 are carried to cup washer 44 for washing. Cup washer 44 can take a number of different conventional forms and any suitable washing apparatus, such as those used for washing glasses, can be used. One embodiment of cup washer 44 comprises cabinet 50 through which cup conveyor 10 passes, and nozzles 52 above and below cups 48 for spraying the cups with hot water and the like.

Third cup tipper 46 is similar to cup tipper 38 and serves to tip the newly cleaned cups 48 back to an upright position in which they can again receive ova from the slaughtered hens of the evisceration line as the cups pass along the portion of conveyor 10 adjacent to the line.

Description of Ova Harvesting Operation

At the harvesting station (the next work station on the evisceration line) each worker inserts a hand into the bird body cavity, palm up, and grasps the ovary between the fingers and the thumb and pulls the ova from the follicle, allowing the ova to fall into the palm of the hand. Then the hand is withdrawn from the body cavity, while the ova are gently held within the hand. Excessive pressure will rupture the vitelline membrane, causing the yolk (principle part of the ova) to flow freely as a liquid, thus that ovum is rendered unsalvageable.

As the hand containing the ova is pulled from the body cavity, the hand is tilted to allow the ova to fall from the hand into a cup 48 located in close proximity (i.e., within 4 to 14 inches, preferably 6 to 8 inches) directly below position of the bird. The worker uses her other hand to hold the bird firmly while the ova is being removed and to position the body cavity opening directly above the ova harvesting system cup.

The cup opening is large enough to catch any ova that might spill from the workers hand after exiting the body cavity and being located directly under the body cavity opening, all the ova is gently deposited into the cup. Each cup in the ova harvesting system is synchronized with a shackle to facilitate the rejection of that ova if the bird from which that ova was taken is reject.

After the ova has been placed into a cup, the bird is taken by the overhead shackle conveyor to the viscera pulling station, afterwhich the bird is inspected for wholesomeness. The cup containing the ova is carried away from the evisceration line before reaching the viscera pulling station via the ova harvesting system continuous conveyor, to a point on the opposite side of the system where the cups pass over a rejection tank. If the bird from which the ova was taken is condemned, the ova is deposited in the rejection tank usually by the action of the inspector. All nonrejected ova are deposited in the ova receiving tank. Shackles are usually color coded, so the cups should be color coded also. As the inspector removes the bird from the shackle, a lever is tripped to activate the air operated cup tipper to reject the ova. When the lever is tripped air is allowed to pass through a tube (pipe) to the tipper where it pushes a plunger which tips the cup.

Both the rejection tank and the ova tank are water flushed to carry the ova through flumes to holding containers. The vitelline membrane will adhere to dry surfaces and rupture.

Although the invention has been described in detail with respect to an exemplary embodiment thereof, it will be understood by those skilled in this art that variations and modifications may be effected in this embodiment within the scope and spirit of the invention.

I claim:

1. An ova harvesting system used as an adjunct to a poultry evisceration line of the type which includes a carcass conveyor for moving slaughtered fowl to various work stations including in sequence an opening cut station, a viscera pulling station, and an inspection station, said ova harvesting system comprising:

an ova collecting station located on said evisceration line between said opening cut station and said viscera pulling station for collecting ova from poultry carcasses, a cup conveyor positioned in a manner such that it converges with said carcass conveyor upstream from said ova collecting station and diverges from said carcass conveyor upstream from said viscera pulling station;

a plurality of cups mounted sequentially along said cup conveyor for containing ova collected at said ova collecting station;

a reject tank positioned beneath said cup conveyor downstream of said evisceration line.

an ova receiving tank positioned beneath said cup conveyor downstream of said reject tank;

a first discharge means engaging said cups at said reject tank for discharging ova contained in said cups into said reject tank;

an actuating means located at said inspection station and connected to said first discharge means for actuating said discharge means;

a second discharge means engaging said cups at said receiving tank for discharging ova contained in said cups into said receiving tank; and a cup conveyor driving means for driving said cup conveyor in a manner such that when a carcass is at said ova collecting station one cup of said plurality of cups is located in close proximity below said carcass, and when said carcass is at said inspection station said cup is positioned over said reject tank.

2. The combination claimed in claim 1 wherein said driving means is driven from said evisceration line.

3. The combination claimed in claim 2 wherein said shackle conveyor comprises an overhead conveyor and said driving means comprises a first gear wheel driven by said overhead conveyor, an intermediate drive shaft connected to said first gear wheel, and a further gear wheel, connected to said drive shaft, for driving said cup conveyor.

4. The combination as claimed in claim 1 which further contains a cup washing station located downstream of said ova receiving tank, said cup washing station comprising washing means for washing said cups.

5. The combination as claimed in claim 1 where said first cup tipper means comprises an air operated cup tipper.

6. The combination as claimed in claim 1 further comprising first and second flumes connected respectively to said reject tank and to said ova receiving tank.

7. A method of harvesting ova from the carcasses of slaughtered fowl being treated on a poultry evisceration line of the type which includes a carcass conveyor for moving carcasses to various work stations including, in sequence, an opening cut station, a viscera pulling station, and an inspection station, the method comprising:

removing ova from a poultry carcass at an ova collecting station located on said evisceration line between said opening cut station and said viscera pulling station;

placing the ova in a cup located in close proximity below said carcass, said cup being one of a plurality of cups mounted sequentially along a cup conveyor positioned in a manner such that said cup conveyor converges with said carcass conveyor upstream from said ova collecting station and diverges from said carcass conveyor upstream from said viscera pulling station;

driving said cup conveyor in a manner such that when a carcass is at said inspection station the cup containing the ova from that carcass is over an ova reject tank which is located beneath said cup conveyor at a point remote from said evisceration line;

discharging into said ova reject tank all ova from carcasses which have been rejected by remote control from the inspection station;

collecting all nonrejected ova.

* * * * *